United States Patent [19]

Balhorn

[11] 4,261,335

[45] Apr. 14, 1981

[54] SOLAR ENERGY APPARATUS

[76] Inventor: Alan C. Balhorn, 105 Hidden Meadow Rd., Apple Valley, Minn. 55124

[21] Appl. No.: 951,480

[22] Filed: Oct. 16, 1978

[51] Int. Cl.³ .............................. F24J 3/02; G02B 5/10
[52] U.S. Cl. ................................... 126/438; 126/437; 126/424; 350/293
[58] Field of Search ............... 126/438, 451, 436, 437; 310/4; 350/293, 296, 299

[56] References Cited

U.S. PATENT DOCUMENTS

| | | | |
|---|---|---|---|
| 1,248,456 | 12/1917 | Clark | 126/451 |
| 3,467,840 | 9/1969 | Weiner | 310/4 |
| 3,780,722 | 12/1973 | Swet | 126/451 |
| 3,996,917 | 12/1976 | Trihey | 126/438 |
| 3,996,919 | 12/1976 | Hepp | 126/438 |
| 4,026,267 | 5/1977 | Coleman | 126/436 |
| 4,029,519 | 6/1977 | Schertz | 126/440 |
| 4,146,408 | 3/1979 | Nelson | 350/293 |
| 4,192,289 | 3/1980 | Clark | 126/438 |

Primary Examiner—Samuel Scott
Assistant Examiner—G. Anderson
Attorney, Agent, or Firm—Kinney, Lange, Braddock, Westman and Fairbairn

[57] ABSTRACT

The solar energy apparatus of the present invention collects, concentrates, and transmits solar radiation to a light converter, which converts solar radiation to another energy form. The apparatus includes aspheric reflectors which are used in conjunction with azimuth and altitude tracking means, which controls the position of the aspheric reflectors so that each reflector focuses the solar radiation to a proximate a fixed first position as the sun's position changes during the day. Optical waveguides have their first ends located at the fixed first position. The second ends of the optical waveguides terminate at a light converter. Solar radiation received at the first ends of the optical waveguides is transmitted through the optical waveguides to the second ends, where it is converted to thermal energy by the light converter.

21 Claims, 9 Drawing Figures

SOLAR ENERGY APPARATUS

BACKGROUND OF THE INVENTION

1. Field of the Invention

The present invention relates to solar energy apparatus, in which solar radiation is collected and converted to another form of energy.

2. Description of the Prior Art

The increasing awareness and concern over energy use and conservation has led to increasing use of solar energy apparatus which converts solar radiation to another form of energy. One widely used type of solar energy apparatus converts solar radiation to thermal energy.

One solar energy apparatus of this general type has reflectors or lenses which collect, concentrate, and direct solar radiation onto an absorber containing a heat transfer medium. The collecting and concentrating optics, as well as the absorber, are located in the outside environment, such as on the roof of a building. This type of prior art solar energy apparatus has several disadvantages.

First, the collector apparatus in a typical system is 60% or less efficient due to reflection losses at primary and secondary reflectors, absorption losses through transparent absorption enclosures, heat losses to the environment, and inefficiencies of the heat transfer systems.

Second, the heat transfer medium is circulated through the outdoor environment. In severe climates, this limits the selection of the heat transfer medium, and increases the initial cost.

Third, achievable temperatures are limited by the temperature range of the heat medium and by the principles of heat transfer mechanics. The use/storage apparatus cannot achieve temperatures any greater than the temperature of the heat transfer medium.

Fourth, energy is consumed in continuously circulating the heat transfer medium between the absorber and the use/storage apparatus.

U.S. Pat. No. 3,905,352 by Jahn shows a prior art solar energy apparatus which utilizes an array of movable flat reflectors to concentrate solar radiation on a solar boiler, absorber tube, or similar apparatus. This prior art apparatus requires absorber areas equal in size to the area of the individual reflector, regardless of field size or focal distance. In addition, it requires a complex apparatus for moving the various flat mirrors.

Prior art solar energy apparatus have also used aspheric reflectors rather than flat mirrors like those shown in the Jahn patent. These aspheric reflectors are capable of concentrating solar radiation at a focal line or focal point of the reflector. The focal line or focal point, however, must remain in the same position relative to the reflector.

Another type of prior art solar energy apparatus uses optical waveguides, typically in the form of fiber optic bundles, to collect and transmit solar radiation. U.S. Pat. Nos. 3,467,840 by Weiner; 3,780,722 by Swet; 4,026,267 by Coleman; and 4,029,519 by Schertz et al describe solar energy apparatus using optical waveguides.

One difficulty of the prior art solar energy apparatus using optical waveguides is that the optical waveguides typically accept radiation only from a relatively small angle of incidence. Since the sun's position in the sky changes throughout the day, this significantly reduces the efficiency of the system. For example, in U.S. Pat. No. 4,026,267 by Coleman, fixed lenses are used for directing solar radiation onto the ends of fiber optic bundles. As shown, a significant amount of solar radiation will only be directed onto the ends of the fiber optic bundles when the sun's position is perpendicular to the plane of the array of lenses, which occurs only during a relatively short period of any day.

SUMMARY OF THE INVENTION

The solar energy apparatus of the present invention includes optical waveguide means having a first end located at a fixed first position and having a second end located at a second position. The optical waveguide means transmits at least a first portion of solar radiation received at its first end to the second end.

Solar radiation is collected and concentrated onto the first end of the optical waveguide means by reflector means which is controlled by azimuth and altitude tracking means. The reflector means focuses solar radiation, and the azimuth and altitude tracking means changes the position of the reflector means in first and second directions to maintain the focused solar radiation proximate the fixed first postion.

Light conversion means receive the first portion of solar radiation from the second end of the optical waveguide means. The light conversion means converts the solar radiation to thermal energy.

In a preferred embodiment of the present invention, the solar energy apparatus includes a plurality of reflector means and optical waveguide means arranged in an array to further increase the energy receiving and converting capabilities of the apparatus.

DETAILED DESCRIPTION OF THE PREFERRED EMBODIMENTS

Figure 1:
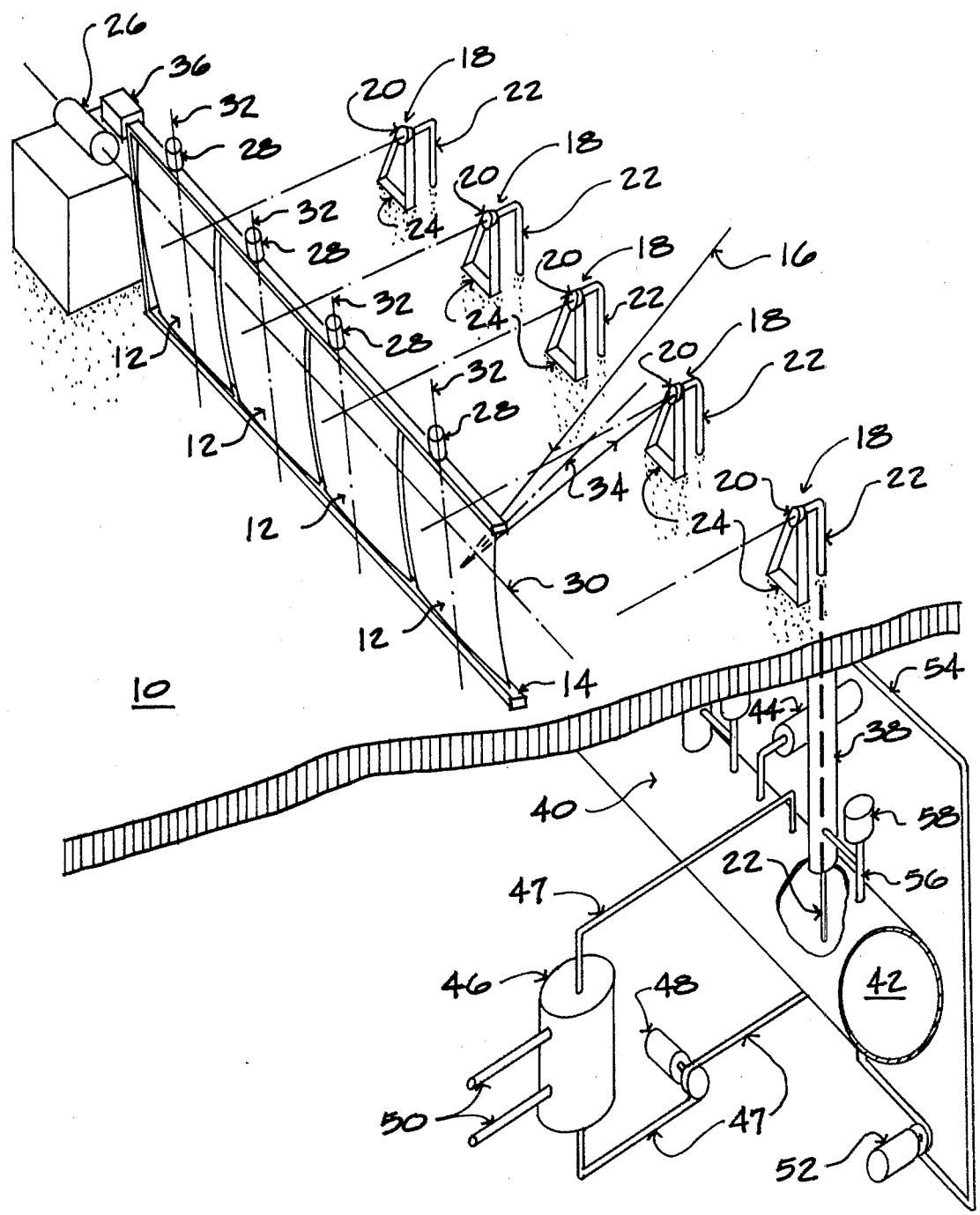
FIG. 1 is a fragmentary perspective illustration of a preferred embodiment of the solar energy apparatus of the present invention.

The Solar Energy Apparatus of FIG. 1

The preferred embodiment of the present invention illustrated in FIG. 1 overcomes many of the problems which have limited the effectiveness of prior art solar apparatus. The apparatus includes a highly efficient system for collecting and concentrating solar energy and for transferring that solar energy to a location within a building or enclosure for conversion to thermal energy.

As shown in FIG. 1, the solar energy apparatus of the present invention includes an energy collection and concentration subsystem which collectors and concentrates the solar energy and which is mounted on a roof deck 10 or similar surface. The apparatus of the present invention also includes a subsystem which converts the solar energy which has been collected and concentrated to thermal energy. This subsystem is located with the building or other enclosure. In FIG. 1, roof 10 has been broken away to show a portion of the solar energy conversion subsystem.

The solar energy collection and concentration subsystem includes an array of aspheric reflectors 12, which are pivotally mounted in reflector support frame 14.

Incident solar radiation rays 16 strike each reflector 12 and are reflected to a fixed first position 18 associated with each reflector 12. Located at each fixed first position 18 are a secondary concentrator 20 and the first end of optical waveguide rod 22. The secondary concentrator 20 is positioned forward of the first end of optical waveguide rod 22, and both secondary concentrator 20 and waveguide rod 22 are supported by a support 24 at the fixed first position 18.

Because the sun's position with respect to roof 10 changes during the sunlight hours, altitude adjusting means 26 and azimuth adjusting means 28 change the positions of the aspheric reflectors 12 to maintain the concentrated solar radiation on the ends of optical waveguide rods 22. Altitude adjusting means 28 pivots reflector supporting frame 14 about horizontal pivot axis 30, thereby pivoting all of the reflectors 12 by an equal amount. Azimuth adjusting means 28 adjust the respective mirrors 12 about vertical pivot axes 32.

In the preferred embodiment shown in FIG. 1, each reflector 12 is pivoted about axes 30 and 32 to maintain its focal axis 34 at a half angle position between the sun and the fixed first position associated with that particular aspheric reflector during a majority of the hours of sunlight. The operation of altitude adjusting means 26 and azimuth adjusting means 28 is controlled by control 36, which supplies control signals which determine the desired location of each reflector 12 about both horizontal axis 30 and its vertical axis 32. In one preferred embodiment, control 36 is a microcomputer which has stored in memory the desired positions of reflectors 12 as a function of time for each day of operation. This form of control is an open loop control, since it does not depend upon sensing of the sun's position, but rather is determined by stored information within the memory of microcomputer 36.

In the preferred embodiment of the present invention shown in FIG. 1, altitude adjusting means 26 includes an electrical motor which is driven by electrical signals from control 36. Similarly, azimuth adjusting means 28 is shown in FIG. 1 as individual motors controlled by control 36 which pivot each of the reflectors 12 about their respective vertical axes 32. Alternatively, a single motor may drive reflectors 12 about their respective vertical axes 32 through an appropriate mechanical linkage (not shown).

Altitude adjusting means 28 also preferably inverts the reflector supporting frame 14, together with reflectors 12, at night and at other times when the solar energy apparatus is not in use. This protects reflectors 12 during non-operating periods.

In one preferred embodiment of the present invention, optical waveguide rods 22 have a vacuum deposited, antireflection coating on their solar radiation receiving first ends. This coating increases the percentage of concentrated solar radiation internalized by optical waveguide rods 22 from approximately 90% to approximately 98%.

In one preferred embodiment, optical waveguide rods 22 are formed of a 96% silica glass, which is selected for its ability to transmit light efficiently and for its long term stability under exposure to high concentrations of ultra-violet wavelength portions of solar radiation. Optical waveguide rods 22 of the preferred embodiment are approximately 1.50 inches in diameter to receive solar radiation reflected directly to optical waveguide rods 22 by the primary aspheric reflectors 12 or reflected to rods 22 by secondary concentrators 20.

As shown in FIG. 1, each optical waveguide rod passes through an opening in roof 10, through a shroud 38 and into a light conversion reservoir or tank 40. The second end of rod 22 extends into the interior of reservoir 40 and is immersed in a use/storage medium 42 contained within reservoir 40.

Light transmitted by optical waveguide rods 22 impinges upon the use/storage medium 42 and is converted to heat. The insulated storage reservoir 40, use/storage medium 42, expansion tank and piping 44, heat exchanger 46, piping 47, pump and controls 48, and use system piping 50 are all located within the building enclosure.

In a preferred embodiment of the present invention, use/storage medium 42 is an oil medium of Caloria HT43, which is selected for its temperature range of up to 375° F. and its comparative low cost. The cost of filling reservoir tank 40 with a large volume of fluid is further reduced by partially filling reservoir 40 with rocks. The oil/rock storage medium 42 provides a somewhat greater thermal capacity than all oil.

The fluid use/storage medium 42 is circulated between reservoir 40 and heat exchanger 46 through piping 47 and pump 48. Heat is extracted from the medium 42 within heat exchanger 46, and this heat is transferred to the desired end use by piping 50.

In the preferred embodiment of the present invention, the optical immersion of the ends of optical waveguide rods 22 in use/storage medium 42 permits high efficiency transfer of the solar radiation to the use/storage medium 42. A special optical coating on the second ends of rods 22 is typically not required.

Although a significant portion of solar radiation received on the first ends of optical waveguide rods 22 is transmitted to the second ends of rods 22 and into medium 42, a second portion of solar radiation is converted to heat along the length of the optical waveguide rods 22. This conversion to heat is the result of light transmission losses within optical waveguide rods 22. In the preferred embodiment of the present invention shown in FIG. 1, an active heat transfer system is also included. This active heat transfer system includes shrouds 38, which surround rods 22 from the inner surface of roof 10 to reservoir 40. Use/storage medium 42 is circulated by pump 52 and piping 54 and 56 from tank 40 through shroud 38 and back to tank 40. Flow control 58 controls the flow of the circulating medium 42. The circulating use/storage medium 42 collects heat generated by optical transmission losses in optical waveguide rods 22 and transfers it to reservoir 40.

Preferred Embodiment of the Aspheric Reflectors 12

In the preferred embodiments of the present invention, the aspheric reflectors 12 are oriented with respect to pivot axes 30 and 32 so that the reflector surface of reflectors 12 are located rearward of the pivot axes. In addition, those segments of each reflector that advance toward the fixed location of the first end of waveguide rod 22 are effectively greater in width than those segments which retreat from the fixed position of the first end. Also, each point of the reflector 12 surfaces is tilted with the total travel of the reflected rays 16 from that point at the fixed first position 18 centered on the fixed first position 18. This unique configuration provides greater concentrating efficiency in directing the solar radiation to the fixed first position 18 of the first ends of optical waveguide rods 22.

Figure 2:
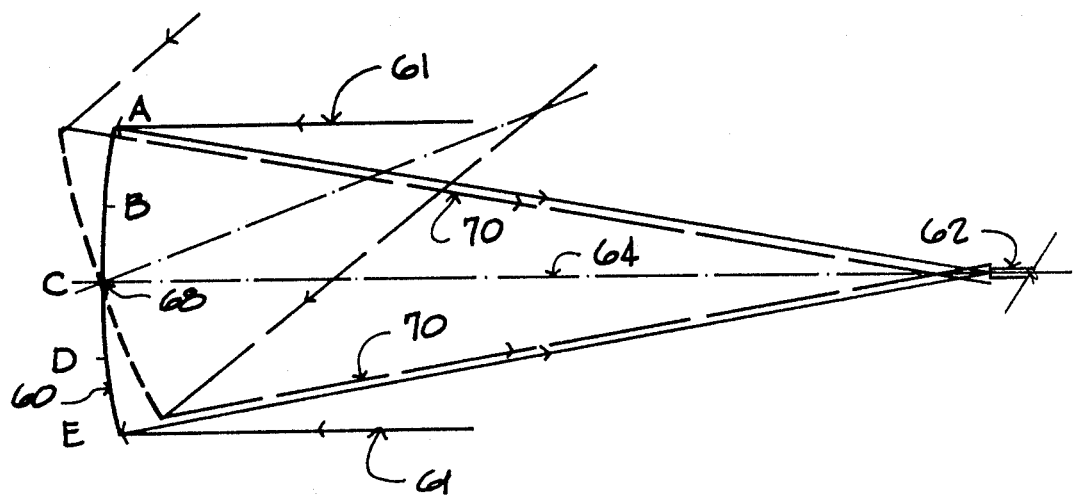
FIG. 2 is a diagrammatic illustration of the reflected rays of solar radiation by a tracking parabolic reflector with the pivot point of the reflector at the apex of the parabolic curvature.
Figure 3:
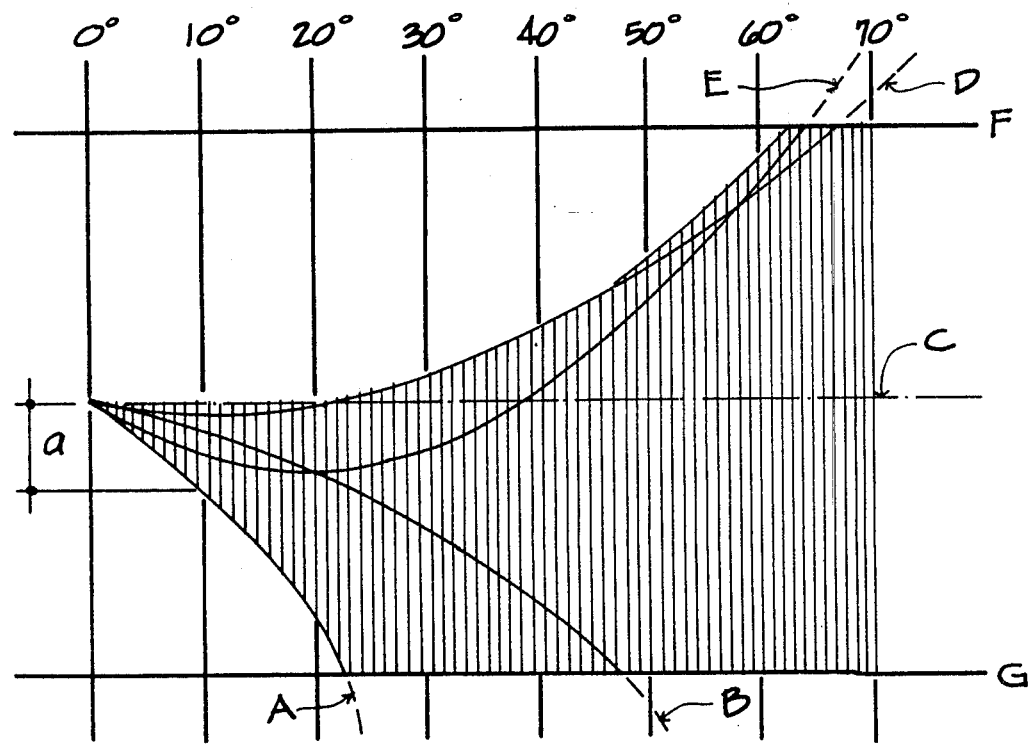
FIG. 3 is a chart of the pattern of reflected rays on the receiver from selected points A, B, C, D and E on the reflector of FIG. 2 through 70 degrees of rotation of the sun awayfrom the receiver.

To appreciate the advantages of this unique reflector configuration, a consideration of pivoted parabolic reflectors, and their limitations in concentrating solar radiation onto a fixed receiver is of interest. FIGS. 2 and 3 describe the operation of a pivoted parabolic reflector 60.

In the following discussion, one criterion of reflector performance will be that the focused radiation will fall within a 21 mrad angular dimension limit from the reflector 12, which is the aperature width of the secondary concentrators 20. This requirement is necessary since optical waveguide rod 22 accepts incident radiation only within a restricted cone of incidence and the aperture width of the secondary concentrators 20 is limited by the cone of incidence and the diameter of the optical waveguide rods 22 to 21 mrad. Since the major consideration is to direct as much radiation as possible into rods 22, the limitation on angular dimension is of major importance. The angular dimension of the ends of optical waveguide rods 22 is 11 mrad.

Parabolic reflector 60 focuses the rays 61 of solar radiation to a common point at receiver 62 on its focal axis 64 when the solar rays 61 are parallel to the focal axis 64 as shown in solid lines in FIG. 2. As the parabolic reflector 60 is rotated about an axis 68 through the apex of the parabolic curvature to maintain a half angle position between the sun and the fixed receiver 62, the reflected rays 70 from the A to C portion of the reflector 60 moving away from the receiver 62, strike the receiver 62 at increasingly further distances from the zero angle focal point as the angle between the sun and the fixed receiver 62 increases. Rays 70 reflected from point C remain focused on the same point on the receiver 62. However, rays 70 reflected from the C to E portion diverge from the zero angle focal point in a more erratic pattern.

FIG. 3 is a chart which shows the relative distance a from the zero angle focal point of the reflected rays 70 of the points A to C of the reflector 60 surface through 70 degrees of angular rotation between the sun and the fixed receiver 62 as computed by the equation:

$$a = b(1 - \cos \phi + \frac{b \sin \phi}{c})$$

and of points C to E as computed by the equation:

$$a = -b(1 - \cos \phi - \frac{b \sin \phi}{c})$$

where:
b = distance of the reflecting point from point C on the reflector 60 surface.
c = focal length of reflector 60.
$\phi$ = one-half the angle between the sun and the receiver 62.

For purposes of simplification, the above equations do not incorporate the minor effect of the curvature of the reflector 60, representing instead, values from a flat plane of parabolically tilted, infinitely numerous segments.

As shown in FIG. 3, a parabolic reflector 60 does not provide the limited pattern of reflected light preferred for the present invention through sufficiently wide angles between the sun and the receiver 62. The preferred limits of 21 mrad from line F to G are shown in FIG. 3. It is computed that a parabolic reflector of a size and focal length for the presently preferred invention would provide a pattern or reflected light exceeding 21 mrad at an angle of approximately 23 degrees between the sun and the receiver, and would provide an even larger pattern at greater angles.

The preferred embodiment of the present invention provides an aspheric reflector 12 having a different configuration in the vertical cross section than in the horizontal or plan cross section. As a result, a significant reduction in the size of the pattern of reflected solar radiation is achieved.

Figure 4:
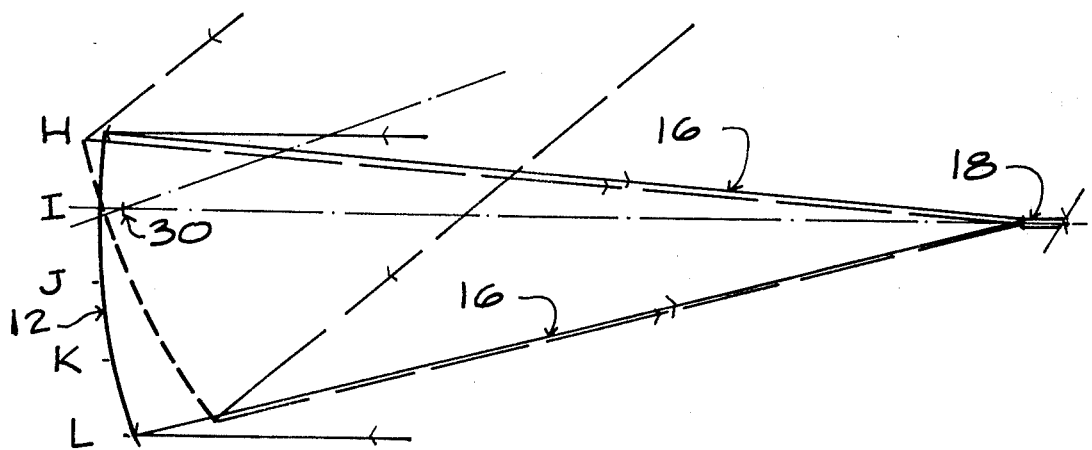
FIG. 4 is a diagrammatic illustration of the reflected rays of solar radiation by an aspheric reflector of the preferred embodiment for the vertical section of the present invention, with the pivot axis of the reflector forward of the reflector surface.

FIG. 4 shows the vertical cross section of the reflector 12. Reflector 12 is an aspheric, nearly parabolic reflector, that is advantageously configured to reflect rays 16 from each point on the surface of the reflector 12 to the receiver within the preferred angular distance of 21 mrad through at least 70 degrees of angle between the sun and the receiver. As shown in FIG. 4, reflector 12 has a greater portion that advances toward the receiver (i.e. secondary concentrator 20 and rod 22) at fixed first position 18 than retreats from the receiver. Horizontal reflector pivot axis 30 is located forward of the reflector surface.

The modified equations that encompass the combined advantages of the configuration of reflector 12 are:

$$a = b(1 - \cos \phi) + d \sin \phi + \frac{b(b \sin \phi - d(1 - \cos \phi))}{c}$$

for points of the reflector 12 from H to I and $$a = -b(1 - \cos \phi) + d \sin \phi + \frac{b(b \sin \phi + d(1 - \cos \phi))}{c}$$

for points on the reflector 12 from i to L where:

b = distance of reflecting point from point I on the reflector 12 surface.

c = focal length of reflector 12.

d = distance from reflector 12 surface to pivot point 30.

$\phi$ = one-half the angle between the sun and the receiver

As before, the above equations do not incorporate the minor effect of the curvature of reflector 12.

The advantageously configured curvature of reflector 12 purposely does not focus all reflected rays 16 to a common focal point when the angle between the sun and the receiver is zero, as a true parabolic reflector does. The curvature is adjusted such that the total traversed pattern of reflected solar radiation from each point on the reflector 12 surface is centered on the receiver at fixed first position 18, as is shown in FIG. 5, from the preferred angles of zero degrees to at least 70 degrees between the sun and fixed first position 18, and is within the preferred limit of 21 mrad as shown by lines M and N.

The forward horizontal pivot axis 30 of reflector 12 reduces the angular dimension of the pattern from the portion of the reflector 12 that advances toward the fixed first position 18 of the receiver, and is advantageously utilized in the preferred embodiment with a reflector 12 that provides a major portion of its surface advancing toward the receiver.

Figure 5:
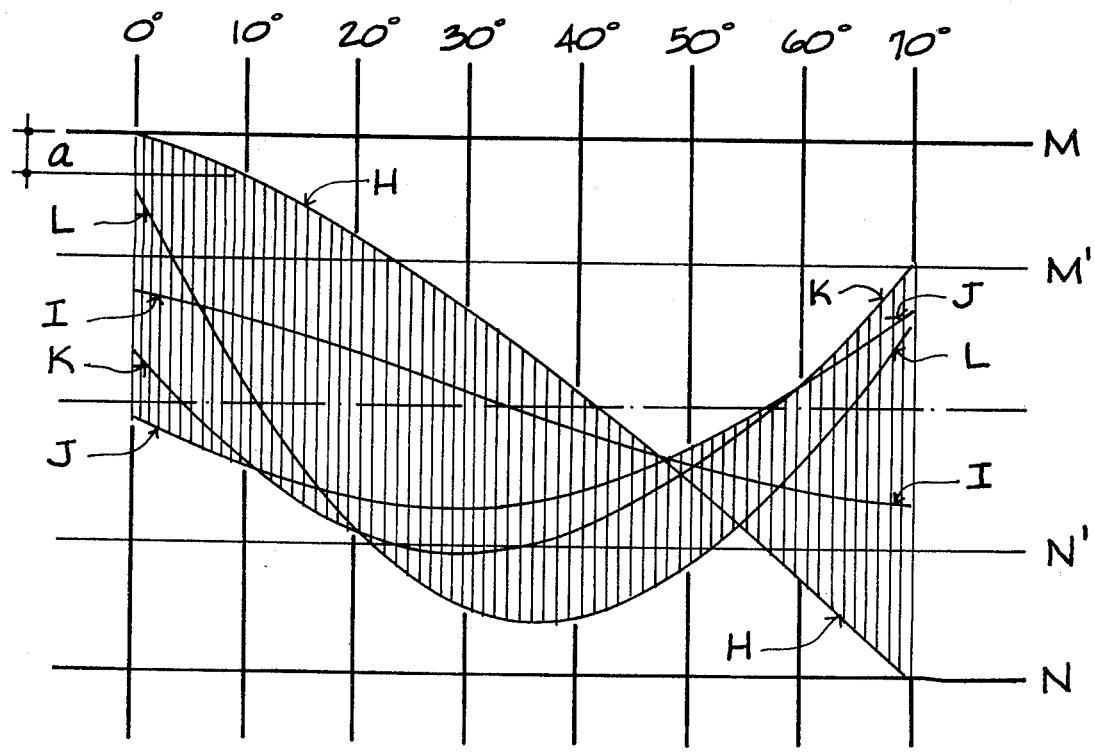
FIG. 5 is a chart of the pattern of reflected rays on the receiver from selected points H, I, J, K and L on the reflector of FIG. 4 through 70 degrees of elevation of the sun away from the receiver.

The preferred limit of 21 mrad of angular dimension shown in FIG. 5 by lines M and N is the aperture width of the secondary concentrator 20 as shown in FIG. 1. M' to N' of FIG. 5 is an angular dimension of 11 mrad and is the preferred width of the optical waveguide rod 22 as shown in FIG. 1. Through the preferred angles of zero degrees to at least 70 degrees between the sun and the fixed first position 18, a majority of the reflected solar radiation is focused directly onto the optical waveguide rods 22, and only a small portion is reflected by the secondary concentrators 20, wherein an additional reflectance loss would be incurred.

Figure 6:
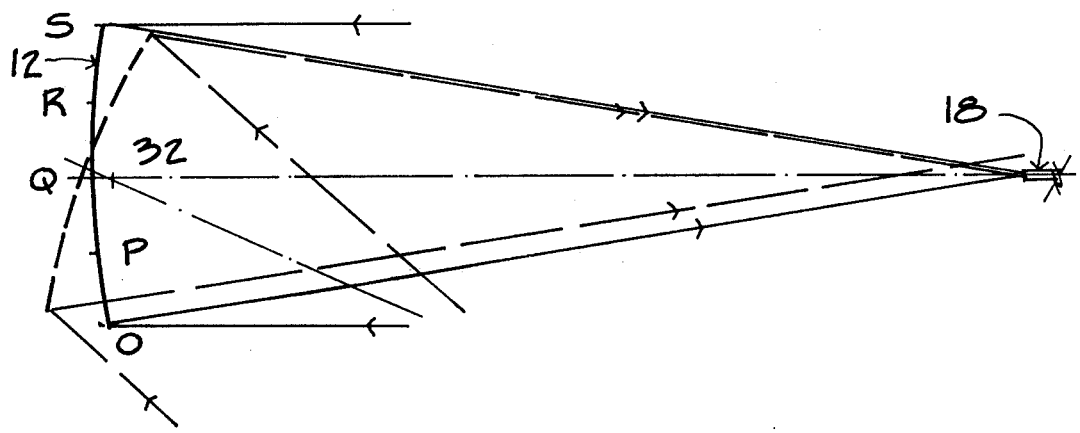
FIG. 6 is a diagrammatic illustration of the reflected rays of solar radiation by an aspheric reflector of the preferred embodiment of the plan section of the present invention, with the pivot axis forward of the reflector surface.
Figure 7:
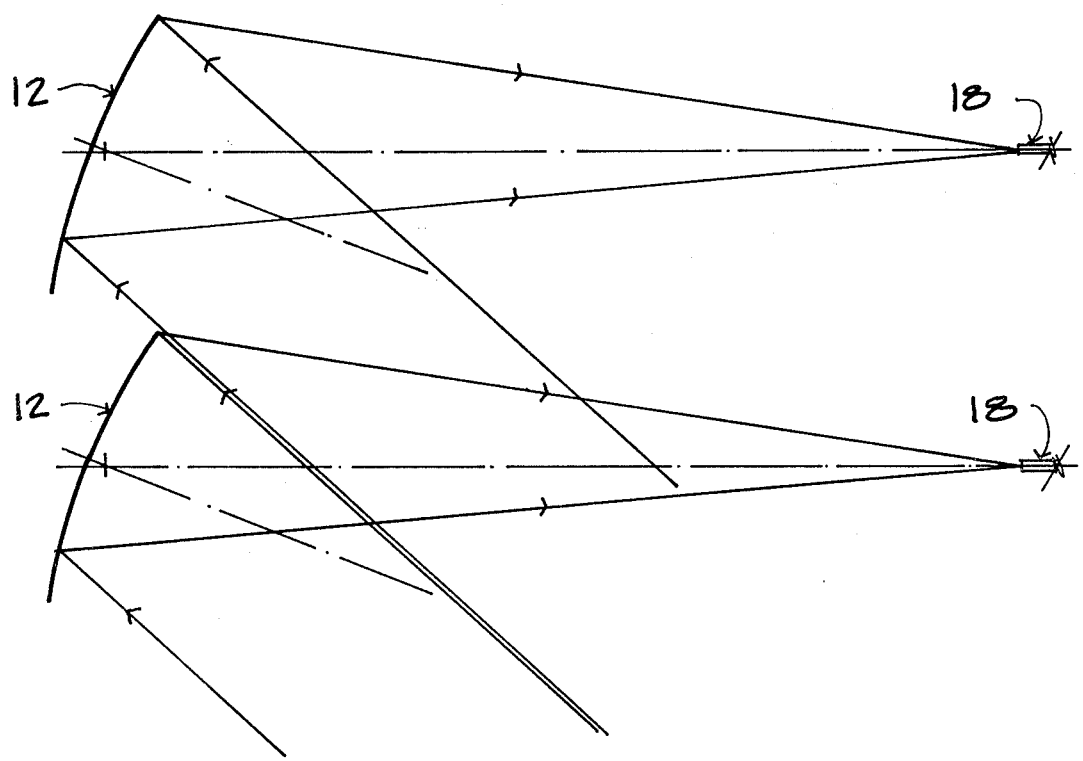
FIG. 7 is a diagrammatic illustration of adjacent reflectors of the preferred embodiment of the present invention and the resultant shading of adjacent reflectors at large angles between the sun and the receiver.

The preferred embodiment of the horizontal or plan cross section of the reflectors 12, as shown in FIG. 6, also provides that vertical pivot axis 32 be located forward of the reflector surface. Reflector 12 has equal portions of its reflector surface on each side of vertical pivot axis 32, but in the preferred embodiment, shown in FIG. 7, one reflector 12 shades the portion of the adjacent reflector 12 that rotates away from its associated receiver, resulting in an effective reduction of the retreating reflector area. This effective reduction is similar in effect to the selection of the vertical cross section of the reflectors 12 in FIG. 4. The distance between the reflectors 12 of FIG. 7 determines the extent of shading and is selected in the preferred embodiment to maximize the reflector area "seeing" the sun without reflecting solar radiation to the receiver outside the preferred angular dimension of 21 mrad.

Figure 8:
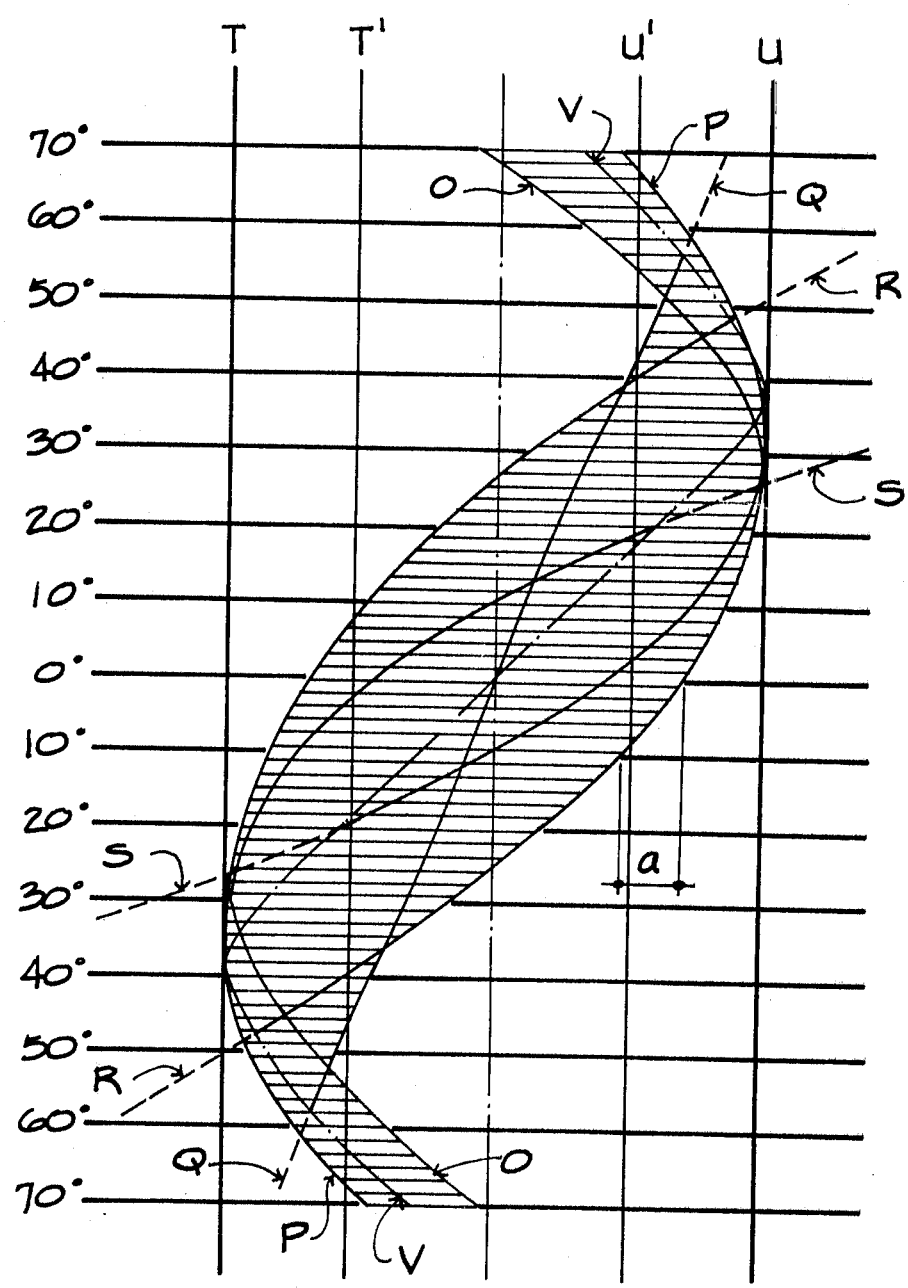
FIG. 8 is a chart of the pattern of reflected rays on the receiver from selected points O, P, Q, R and S on the reflectors of FIGS. 6 and 7 from 70 degrees east of solar noon, to solar noon, to 70 degrees west of solar noon.

The preferred embodiment of the horizontal or plan cross section of the reflectors 12, as shown in FIG. 6, also provides the same centering of the total traversed pattern of reflected solar radiation from each point on the unshaded portion on the reflector 12 surface on the receiver at fixed first position 18, as shown in FIG. 8. The shading effect is shown by line V, and the reflected solar radiation is focused within the preferred limit of 21 mrad of angular dimension as shown by lines T and U, which is again the aperture width of the secondary concentrators 20. T' to U' is again an angular dimension of 11 mrad and is the preferred width of the optical waveguide rods 22 as shown in FIG. 1. Through the preferred angles of zero degrees to at least 70 degrees between the sun and the receiver, the portion of the concentrated solar radiation focused between T' and U' is focused directly on the optical waveguide rods 22 without an additional reflectance light loss.

The equations for a are the same as stated above for the vertical cross section of reflector 12, wherein the first equation determines a for points on the reflector 12 rotating away from the receiver, either left or right, and the second equation determines a for points on the reflector 12 advancing towards the receiver, either left or right.

The shading of one reflector 12 by the adjacent reflector 12 results in a reduction of the effective area of a row of reflectors as the angle between the sun and the receiver increases. The reduction occurs as a cosine function of the angle, and is the same as the reduction in other collector configurations such as fixed collectors or closely spaced tracking collectors, as the angle of the sun to the common plane of the collectors decreases. In combination with the aspheric configuration of the reflectors in the present invention, the shading reduces the reflected pattern of solar radiation to line V in FIG. 8.

In one preferred embodiment of the collecting and concentrating means of the present invention, the reflector 12 dimensions are as follows:

FIG. 4
  H to I—8 inches
  I to L—40 inches

FIG. 6
  O to Q—24 inches
  Q to S—24 inches

These dimensions provide a reflector area of 48 inches by 48 inches. The focal length c of this preferred example is 136 inches, the dimension d between the pivot axis and the reflectors surface is 2 inches, and the distance between the edges of the reflectors is 2 inches. The collected and concentrated solar radiation from reflectors 12 of this size is focused on secondary concentrators 20 of 2.84 inches in width, which is 20.9 mrad of angular width.

It is known that the size, focal length, pivot offset distance and configuration of the reflectors may be varied, independently or in combination, to affect the performance of the collecting and concentrating means.

Figure 9:
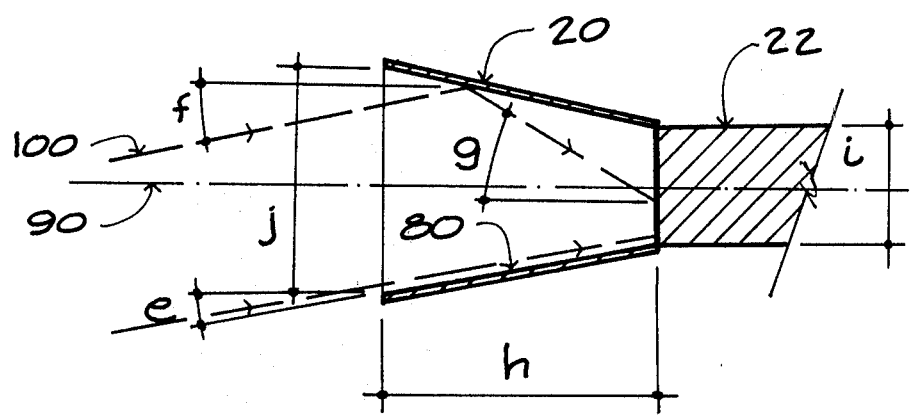
FIG. 9 is a diagrammatic illustration of a preferred embodiment of a secondary concentrator.

FIG. 9 shows a preferred embodiment of secondary concentrator 20, which is provided at the end of the optical waveguide rod 22. Secondary concentrator 20 is conical in shape, and has a maximum angle e of 10 degrees between the reflective surface 80 of the secondary concentrator 20 and the axis 90 of the optical waveguide rod 22. Reflected solar rays 100 do not exceed an angle f of more than 10 degrees and are reflected onto the end of the optical waveguide rod 22 within an angle g of about 30 degrees, the maximum allowable incidence angle to the optical waveguide rod 22.

The length h of secondary concentrator 20 is limited to slightly less than 2.5 times the width i of optical waveguide rod 22. In the preferred embodiment with the example size of the presently preferred primary reflectors given above, a secondary concentrator 20 equal in size to the above-stated receiver size of 2.84 inches across its opening j provides secondary concentration of the concentrated solar rays 100 to a width of 1.50 inches at optical waveguide rod 22, with a magnification of over 1,300.

CONCLUSION

The solar energy apparatus of the present invention improves upon prior art systems by providing a collector and concentrator of solar radiation with an efficiency of up to 80%. It does not require circulation of the heat transfer medium outside of the building enclosure and is capable of achieving extremely high temperatures. The present invention consumes energy for the transmission of only a portion of the collected solar energy.

As described above, the present invention provides a tracking, aspheric reflector system which is capable of concentrating radiation to a much smaller, fixed receiver in substantially higher concentrations than has heretofore been available through significantly large angles between the sun and the receiver.

Although the present invention has been described with reference to preferred embodiments, workers skilled in the art will recognize that changes may be made in form and detail without departing from the spirit and scope of the invention.

What I claim is:

1. A solar energy apparatus comprising:
   a receiver including optical waveguide means having a first end and a second end, the optical waveguide means transmitting solar radiation received at the first end to the second end;
   aspheric non-parabolic reflector means for concentrating solar radiation, the aspheric non-parabolic reflector means being pivoted for movement about first and second pivot axes forward of and proximate to an aspheric reflector surface of the aspheric reflector means, the aspheric reflector surface having a segment which advances toward the receiver and a segment which retreats from the receiver as the aspheric reflector means is rotated about the first axis, the segment which advances having a greater effective width than the segment which retreats, an angular dimension of reflected solar radiation from the segment which advances being reduced as the reflector means is rotated about the first axis, and wherein the aspheric reflector surface has a curvature which causes a total pattern of reflected solar radiation from the reflector surface to be essentially centered on the receiver over a preferred range of angles between the receiver and the sun;
   aximuth and altitude tracking means for rotating the reflector means about the first axis and the second axis to maintain the concentrated solar radiation proximate the receiver; and
   light conversion means for receiving the solar radiation from the second end of the optical waveguide means and converting the solar radiation to useful work.

2. The solar energy apparatus of claim 1 wherein the light conversion means comprises:
   a first use/storage medium;
   first heat storage reservoir means for containing the first use/storage medium; and
   first heat dispensing means for dispensing heat from the use/storage medium.

3. The solar energy apparatus of claim 2 wherein the first use/storage medium comprises a fluid, and wherein the second end of the optical waveguide means is immersed in the first use/storage medium.

4. The solar energy apparatus of claim 1 and further comprising active heat transfer means for collecting, from the optical waveguide means, heat produced by light transmission losses of a portion of the solar radiation in the optical waveguide means.

5. The solar energy apparatus of claim 4 wherein the active heat transfer means includes shroud means surrounding at least a portion of the optical waveguide means, and means for circulating a second use/storage medium within the shroud means to collect heat from the optical waveguide means.

6. The solar energy apparatus of claim 4 wherein the first end of the optical waveguide means is exposed to an outdoor environment and the second end is not exposed to an outdoor environment, and in which the active heat transfer means is not exposed to the outdoor environment.

7. The solar energy apparatus of claim 1 wherein the receiver further includes:
   secondary concentrating means proximate the first end of the optical waveguide means for receiving solar radiation from the reflector means and concentrating the solar radiation on the first end of the optical waveguide means.

8. The solar energy apparatus of claim 7 wherein the secondary concentrating means comprises a conical reflector fixedly located with respect to the first end of the optical waveguide means.

9. The solar energy apparatus of claim 8 wherein the conical reflector reflects solar radiation received within approximately a 10° angle of its axis to the first end of the optical waveguide means within approximately a 30° angle of its axis.

10. The solar energy apparatus of claim 1 wherein the optical waveguide means comprises an optical waveguide rod.

11. The solar energy apparatus of claim 10 wherein the optical waveguide rod has an optical coating on the first end to reduce reflection losses of solar radiation directed onto the first end.

12. The solar energy apparatus of claim 1 wherein the preferred range of angles is between about 0° and about 70°.

13. In a solar energy apparatus which converts solar radiation to another form of energy, an improved apparatus for collecting and concentrating solar radiation at a receiver, the improved apparatus comprising:
   first aspheric non-parabolic reflector means for focusing solar radiation, the first aspheric non-parabolic reflector means having an aspheric reflector surface having a curvature which causes a total traversed pattern of reflected solar radiation from the reflector surface to be essentially centered on a receiver over a preferred range of angles between the receiver and the sun;
   azimuth and altitude tracking means for pivoting the first aspheric reflector means about first and second axes to maintain the concentrated solar radiation proximate the receiver; and
   wherein the first aspheric reflector means has a segment which advances toward the receiver and a segment which retreats from the receiver when the azimuth and altitude tracking means pivots the first aspheric reflector means about the first axis and has a segment which advances toward the receiver and a segment which retreats from the receiver when the azimuth and altitude tracking means pivots the aspheric reflector about the second axis, the segment which advances toward the receiver having a greater effective width than the segment which retreats from the receiver, and wherein the first and second axes are positioned forward of and proximate to the reflector surface at positions which cause an angular dimension of reflected solar radiation from the segment which advances to be reduced.

14. The solar energy apparatus of claim 13 wherein the preferred range of angles is between about 0° and about 70°.

15. The solar energy apparatus of claim 13 wherein the reflector means does not focus all reflected rays to a common focal point.

16. The invention of claim 13 further comprising:
second aspheric reflector means for concentrating solar radiation;
wherein the azimuth and altitude tracking means pivots the second aspheric reflector means about axes essentially parallel to the first and second axes to maintain the concentrated solar radiation from the second aspheric reflector means proximate a second receiver; and
wherein the first and second aspheric reflector means are positioned proximate one another and wherein the second aspheric reflector means shades a portion of the first aspheric reflector means from reflecting solar radiation beyond a preferred angular dimension.

17. The invention of claim 13 and further comprising:
secondary concentrating means proximate the receiver for receiving solar radiation from the first aspheric reflector means and concentrating the solar radiation.

18. The invention of claim 17 wherein the secondary concentrating means comprises a conical reflector fixedly located with respect to the receiver.

19. A solar energy apparatus for concentrating solar radiation and directing the concentrated solar radiation to a plurality of receivers comprising:
a plurality of non-parabolic aspheric reflectors for concentrating solar radiation to the plurality of receivers wherein each aspheric reflector has an aspheric reflective surface having a curvature which causes a total traversed pattern of reflected solar radiation from the reflector surface to be essentially centered on one of the plurality of receivers over a preferred range of angles between the receiver and the sun;
azimuth and altitude tracking means for pivoting each of the aspheric reflectors about first and second axes to maintain the solar radiation concentrated by each aspheric reflector proximate one of the plurality of receivers; and
wherein each aspheric reflector has a segment which advances toward the receiver and a segment which retreats from the receiver as the aspheric reflector is pivoted about the first axis, and wherein the segment which advances toward the receiver has greater effective width than the segment which retreats from the receiver.

20. The solar energy apparatus of claim 19 and further comprising:
a plurality of secondary concentrators, each secondary concentrator positioned proximate one of the receivers for receiving solar radiation from one of the aspheric reflectors and concentrating the solar radiation at the receiver.

21. The solar energy apparatus of claim 19 and further comprising:
light transmission means having a receiving end positioned at each of the receivers, the light transmission means transmitting solar radiation received at the receivers to second positions; and
light conversion means for receiving solar radiation at the second positions and converting the solar radiation to thermal energy.

* * * * *